United States Patent [19]

Lembke et al.

[11] Patent Number: 4,948,598
[45] Date of Patent: Aug. 14, 1990

[54] PROCESS FOR THE PRODUCTION OF SPARKLING WINE

[75] Inventors: Andreas Lembke, Eutiner-Sielbeck, Fed. Rep. of Germany; Emil Underberg, Dietlikon; Hans J. Strobel, Bassersdorf, both of Switzerland

[73] Assignee: Biodyn AG, Dietlikon, Switzerland

[21] Appl. No.: 299,580

[22] Filed: Jan. 23, 1989

[30] Foreign Application Priority Data

Jan. 20, 1988 [DE] Fed. Rep. of Germany ....... 3801442
Mar. 30, 1988 [DE] Fed. Rep. of Germany ....... 3810753
Nov. 8, 1988 [DE] Fed. Rep. of Germany ....... 3837846

[51] Int. Cl.$^5$ .............................................. C12G 1/06
[52] U.S. Cl. ...................................... 426/23; 426/15; 426/592
[58] Field of Search ..................... 426/592, 13, 15, 11

[56] References Cited

U.S. PATENT DOCUMENTS 1,995,275  3/1935  Heuser .
3,062,656  11/1962 Agabalianz et al. ................ 426/11
3,545,978  12/1970 Gerasimovich et al. ............ 426/11
4,265,914  5/1981  Sarishvili et al. .................... 426/13
4,504,496  3/1985  Underberg et al. ................ 426/592

FOREIGN PATENT DOCUMENTS 2822906  2/1979  Fed. Rep. of Germany .
3411961  10/1985 Fed. Rep. of Germany .
2372228  6/1978  France .
 135828  3/1979  German Democratic Rep. .
2001341  1/1979  United Kingdom .

OTHER PUBLICATIONS

Chemical abstracts, WO. 27863f, Entitled "Use of Yeast Autolyzates During Preparation of Georgian White Table Wines", Claim 78, 1973, p. 358.

Primary Examiner—Marianne Cintins
Attorney, Agent, or Firm—Sughrue, Mion, Zinn, Macpeak & Seas

[57] ABSTRACT

A process for the production of sparkling wine, wherein during secondary fermentation a second yeast portion having a reduced autolysis stability is added.

16 Claims, 2 Drawing Sheets

PROCESS FOR THE PRODUCTION OF SPARKLING WINE

FIELD OF THE INVENTION

The present invention relates to a process for producing a sparkling wine, such as champagne, effervescent wine, bubbling wine, etc.

BACKGROUND OF THE INVENTION

Sparkling wine is produced using, as a starting material, wine which has been sterilized (hereinafter "basic wine"). Yeast is added along with saccharose (hereinafter "filling dosage") to the basic wine. Thereafter, under a pressure seal, the basic wine undergoes secondary fermentation. The dissolved constituents of the yeast are contained in the resulting crude sparkling wine. The insoluble fractions are separated from the crude sparkling wine and saccharose, and optionally other additives (hereinafter "dispatch dosage"), are added so as to obtain the sparkling wine.

In the above-described process, as soon as all of the initially added saccharose is consumed, secondary fermentation is terminated. The yeast cells slowly die and their soluble constituents become dissolved in the resulting crude sparkling wine as a result of autolysis. These constituents are desired in fine sparkling wines because they improve the aroma and/or the sparkle of the wine. Heretofore, in order to substantially dissolve these constituents, the crude sparkling wine is stored for a long time, i.e., several months, at the end of the secondary fermentation. This storage time can be shortened in the case of tank fermentation, i.e., the dissolving of the constituents can be sped up by stirring.

DE-OS 28 22 906 teaches, that in the above-described process, a yeast autolyzate can be added to the basic wine in order to shorten the storage time. The yeast autolyzate is added in solution throughout the entire secondary fermentation and is subjected to metabolysis by the fermentation yeast. However, this method is not adequate since it does not sufficiently shorten the storage time required to substantially dissolve the yeast constituents.

SUMMARY OF THE INVENTION

Accordingly, an object of the present invention is to shorten the storage time for dissolving adequate quantities of yeast constituents.

Another object of the present invention is to avoid decomposition of the dissolved constituents by yeast which is still active in the wine.

Still another object of the present invention is to avoid undesirable aromas and inadequate sparkle.

The above-described objects of the present invention have been met by a process for producing sparkling wine comprising the steps of, (1) adding a first yeast portion and saccharose to sterilized wine, (2) carrying out secondary fermentation, under a pressure seal, wherein dissolved constituents from the first yeast portion are contained in the resulting crude sparkling wine.

(3) separating insoluble fractions from the resulting crude sparkling wine, and (4) adding saccharose, and optionally other additives, to the resulting crude sparkling wine so as to obtain the sparkling wine.

wherein, prior to the end of the secondary fermentation, a second yeast portion is added to the resulting wine mixture of step (1). wherein the autolysis stability of the second yeast portion is reduced by damaging the cell walls thereof prior to the addition of the second yeast portion to the resulting wine mixture of step (1). and wherein the insoluble fractions which are produced due to autolyzation by the first yeast portion are reduced to at least 70%, preferably at least 80%, based on the total amount thereof, and the resulting loss in autolyzate is adjusted by the second yeast portion

BRIEF DESCRIPTION OF THE DRAWINGS

In FIG. 1, the horizontal axis is the time axis with the time (T) in days. On the vertical axis, and with the same linear scale, the saccharose content (S) in g/l the quantity of the not yet autolyzed yeast of the first yeast portion ($H_1$) and the quantity of the not yet autolyzed yeast of the second yeast portion ($H_2$), are plotted as a percentage of the yeast quantity used ($H_1$) or ($H_2$) and the pressure (P) in bar. On the horizontal axis, $H_1 = O$; $H_2 = O$; $S = O$ and $P = 1$ bar.

Figure 1:
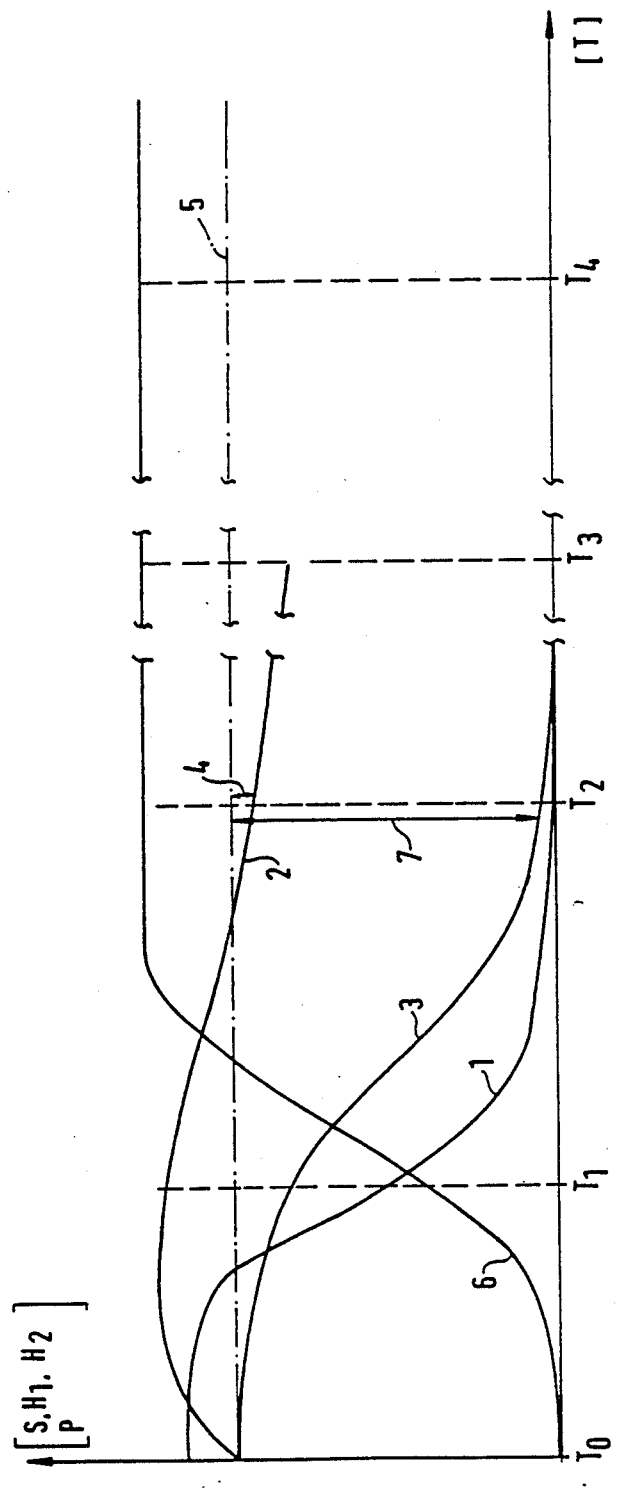
FIG. 1 illustrates secondary fermentation as carried out in Example 1.

The secondary fermentation begins at time $T_O$ In FIG. 1, Curve 1 shows the saccharose content. Curve 2 shows the content of the intact first yeast portion ($H_1$) i.e., which has not yet been autolyzed, and Curve 3 shows the content of the intact second yeast portion ($H_2$). i.e., which has not yet been autolyzed. Curve 6 shows the pressure (P).

The distance between dot-dash line 5, indicating 100% of $H_1$ and $H_2$, and Curve 2, i.e., double arrow 4, represents the percentage of the first yeast portion ($H_1$) which was autolyzed. The distance between dot-dash line 5 and Curve 3, i.e., double arrow 7 represents the percentage of the second yeast portion ($H_2$) which was autolyzed.

Figure 2:
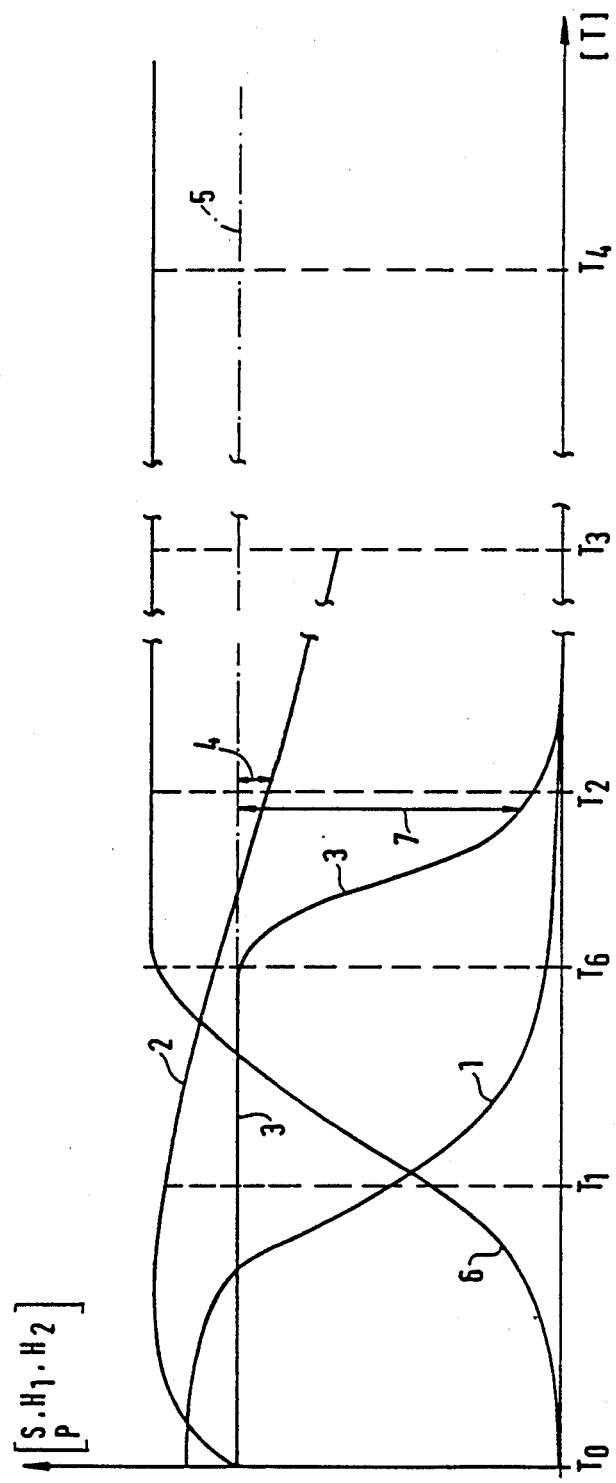

FIG. 2 illustrates secondary fermentation as carried out in Example 2. The expressions in FIG. 2 have the same meaning as described above for that in FIG. 1.

DETAILED DESCRIPTION OF THE INVENTION

In the case of bottle fermentation, the second yeast portion is preferably added to the basic wine prior to beginning the secondary fermentation.

In the case of tank fermentation, the second yeast portion can also be added prior to beginning the secondary fermentation However, it can also be added during the secondary fermentation. This is because no significant loss problem arises when introducing the second yeast portion into the pressurized tank for the secondary fermentation. Thus, in the case of tank fermentation, it is possible to choose, in accordance with the particular circumstances, the time during which the second yeast portion is added during the secondary fermentation. It has been found in the present invention that in the case of tank fermentation, it is preferable to add the second yeast portion after half of the total time required for the secondary fermentation has elapsed.

The second yeast portion is more rapidly subjected to autolyzation than the first yeast portion and consequently gives off its constituents earlier. Adequate constituent quantities in the crude sparkling wine also dissolve earlier. Thus, the storage time can be correspondingly reduced. However, the constituents of the second yeast portion do not immediately dissolve. Dissolving of these constituents only takes place after a time which is necessary in order to autolyse the second yeast portion. By choosing the intensity of the pretreatment of the second yeast portion, and in the case of tank fermentation, additionally by the choice of the time of adding the second yeast portion, the time interval can be adjusted in such a manner that the constituents of the second yeast portion are essentially dissolved only near the end of the boiling phase of the secondary fermentation. As a result, they are no longer exposed to a great extent to the metabolic action of the still active first yeast portion.

Favorable conditions can be achieved when the autolysis stability of the second yeast portion is adjusted in such a manner that the percentage of the cells of the second yeast portion having their cell walls broken open by autolyzation, when 60% of the saccharose has been consumed by the secondary fermentation, is 80 to 90°, preferably 82%, of the total amount of the second yeast portion It is easy to determine the correct autolYsis stability of the second yeast portion. For this purpose, the saccharose content is measured during the secondary fermentation When the saccharose content is reduced to 60%, a sample of the basic wine of the secondary fermentation is removed. The yeast cells of the sample which have broken cell walls can be dyed, preferably with methylene blue. The thus identified yeast cells of the second Yeast portion having broken cell walls are then counted. The remaining cells of the second yeast portion have an irregular shape as compared to the yeast cells of the first yeast portion and are also counted. The result of the first count and the sum of both counts are related to one another.

A part of the first yeast portion may sometimes pass into autolyzation during the measurement. This part is so small that is can be ignored since during the measurement. 40% of the saccharose is still present.

The autolysis stability of the second yeast portion is most easily reduced by heating the yeast to 35 to 55° C., preferably 48° C., for a period of 10 to 40 hours, preferably 20 hours, accompanied by simultaneous stirring. The autolysis stability of the second yeast portion can also be reduced in another way, e.g., by heating using radiation: by shock-like, multiple freezing and thawing: by shock-like multiple application and removal of high pressure (approximately 300 bar): and by ultrasonic action. These physical processes make it possible to reduce the autolysis stability in a precisely predetermined amount.

Chemical processes can also be used for reducing the autolysis stability, but the above physical processes are preferred. This is because with the above physical processes, a residue-free, second yeast portion is obtained.

By trial and error it is possible to find the optimum conditions for the pretreatment of the second yeast portion corresponding to the particular circumstances.

If a correspondingly large second yeast portion is added then, at the end of the secondary fermentation, the necessary constituent quantity is already dissolved and there is no need for a subsequent storage time. Thus, immediately following the end of the secondary fermentation, the insoluble constituents. i.e., the not yet autolyzed yeast, can be separated.

When using a second yeast portion which is much smaller than the first yeast portion, the constituents of the second yeast portion are not sufficient to completely replace the constituents of the first yeast portion. Thus, it is either necessary to be satisfied with a smaller quantity of constituents or, the secondary fermentation must be followed by a storage time, until an adequate amount of constituents from the first yeast portion have been dissolved.

In this manner, more constituents can be dissolved than that obtained using only the first yeast portion for secondary fermentation As a result, a concentration of the constituents is obtained which could not be achieved with the heretofore known processes which employ a long storage time. If a longer storage time is provided, then a weaker autolyzation treatment is adequate, otherwise it takes place in a more intense manner.

The ratio of the added quantity of the second yeast portion to the added quantity of the first yeast portion is chosen while taking into account the desired storage time and the desired aroma and sparkle.

Good results are obtained with 0.01 to 0.06 kg, preferably 0.02 kg, of a dried first yeast portion per 100 liters and 0.5 to 2 times, preferably 1 times as much of the second yeast portion In each case, such is preferably employed prior to the beginning of the secondary fermentation.

The storage time is preferably terminated and the insoluble constituents are separated as soon as the constituents of the two used yeast portions have been dissolved in an amount of from 95 to 120%, preferably 110% of the soluble constituents of the first yeast portion.

Different yeast strains can be used for the first and second yeast portions A sparkling wine yeast is used as the yeast strain for the first yeast portion. Depending on the fermentation conditions, appropriate use can be made of a sparkling wine yeast with a hot fermenting capacity at 18 to 25° C. or sparkling wine yeast with a cold fermenting capacity at 9 to 11° C. The yeast should have the capacity of completely fermenting saccharose under a $CO_2$ pressure of 4 to 7 bar.

Only the constituents and not the fermentation capacity are important for the second yeast portion. Thus, it is possible to use a different yeast strain that the first yeast portion. However, preference is given to the use of the same yeast strain for both the first and second yeast portions For both the first and second Yeast portions it is possible to use, for example, any one of the following yeast strains.

(1) *Saccharomyces cerevisiae*, champagne strain, DSM (Deutsche Sammlung fur Mikroorganismen, Gottingen) No. 70457

(2) *Saccharomyces cerevisiae*, cold fermenting yeast strain. DSM No. 70469

(3) *Saccharomyces cerevisiae*, Rudesheimer strain, DSM No. 70451

(4) *Saccharomyces cerevisiae*, champagne-Ay strain. DSM No. 70459.

These four strains are well known and have been available to the public prior to Jan. 20, 1988.

The following examples are provided for illustrative purposes only and are in way intended to limit the scope of the present invention.

EXAMPLE 1

(Tank Fermentation)

100 liters of clear, sterilized basic wine mixed from selected, thoroughly fermented Riesling wines with an alcohol content of 10 to 11% by volume and a pH of 3.2, were kept at 18° C. Then, a filling dosage comprising 2.5 kg of saccharose. 0.02 kg of a dried first yeast portion and 0.02 kg of a dried second yeast portion, was added thereto.

The first yeast portion consisted of an active. sterile, healthy pure culture of *Saccharomyces cerevisiae*, champagne strain DSM No. 70457. The second yeast portion consisted of a sterile pure culture of the same yeast strain as for the first yeast portion but which, immediately prior to addition to the basic wine, was stirred under sterile conditions for 20 hours at 48° C.

The resulting basic wine was then introduced into a 100 liter capacity pressure tight tank, left to stand at 18° C. and stirred every so often, particularly at the beginning. At time $T_O$, the secondary fermentation began. At time $T_2$, i.e., 20 days after the start of the secondary fermentation, the secondary fermentation was terminated The tank content was then stored for another 20 days and stirred every so often, while maintaining a pressure seal. The tank content was then cooled, using a cooling jacket, to $-4°$ C. This took one day. The cooled tank content was then left to stand for 2 more days until the tartar separated.

When the tartar separated at time $T_3$, i e., 43 days after the start of the secondary fermentation, the solid constituents, essentially constituted by the undissolved residues of the yeast and tartar, were removed by using counterfiltration while maintaining the pressure of the secondary fermentation.

A total of 120% of constituents, based on the used quantity of the first yeast portion, were dissolved in the resulting crude sparkling wine, which was again heated to 18° C. Almost 100% of the constituents resulted from the second Yeast portion and the remainder resulted from the first yeast portion.

Next, a dispatch dosage was prepared comprising saccharose syrup, corresponding to 0.8 kg of pure saccharose, and was dissolved in the crude sparkling wine, while maintaining the pressure of the secondary fermentation. While substantially maintaining this pressure, the sparkling wine was filled into bottles which were then sealed in a pressure tight manner.

As shown in FIG. 1, at time $T_1$, i.e., 10 days after the start of the secondary fermentation. 60% of the saccharose used was consumed and 14% of the yeast cells of the first yeast portion were autolyzed. At time $T_2$, i.e., approximately 20 days after the start of the secondary fermentation, the second fermentation was terminated because all of the saccharose was used up and almost all of the entire second yeast portion was autolyzed. The percentage of the first yeast portion ($H_1$) which was autolyzed, double arrow 4, was 8%.

It is noteworthy that the autolyzate dissolved in the finished sparkling wine was substantially already present at time $T_2$. Freshly dissolved autolyzate consists of colloid-soluble protein fragments, which precipitates after storage If the autolyzate only occurred in the finished sparkling wine, it would lead to cloudiness.

At time $T_3$, i.e., 23 days after $T_2$, the storage was terminated, i.e., the insoluble constituents were separated. In the storage time from $T_2$ to $T_3$ the indicated cloudiness separated and could be filtered out in time $T_3$. It is particularly advantageous in the present invention that at time $T_3$, i.e., after the storage time, a high percentage of the autolyzate was old autolyzate. As discussed above, this is advantageous because new autolyzate, which has just been formed and still contains many colloidally dissolved protein fragments, can lead to cloudiness in the finished sparkling wine.

Using the heretofore known processes, only at time $T_4$, i.e., after roughly 360 days following the start of the secondary fermentation, is the storage time terminated and are the solid constituents removed.

After stationary storage of the filled bottles for 24 days, the sparkling wine was evaluated as follows:
Aroma: champagne-type aroma, mature =D
Sparkle: very fine effervescent champagne sparkle =A
Sediments: clear =G

EXAMPLE 2

(Bottle Fermentation)

The same procedures as in Example 1 were carried out, but bottle fermentation was employed instead of tank fermentation. As in Example 1, the basic wine was clear and the tartar-stabilized at $-4°$ C.

More specifically, in accordance with the classic champagne method, the secondary fermentation was carried out in bottles with a filling volume of 0.75 liters. The basic wine mixed with the filling dosage was filled into 135 bottles. The bottles were then sealed with crown corks.

The bottles were left in the horizontal position at 18° C. After 20 days, the secondary fermentation was terminated. The bottles were then stored for 40 days at 14° C., after which they are turned over, so that the yeast detached from the walls of the bottles. The bottles were then placed on a Vibrating device and vibrated for 14 days. i.e., the bottles were gradually brought from the horizontal position and turned so that the bottleneck pointed downwards. As a result, the solids, which collected in the bottleneck and solidified in the freezing bath, were discharged by opening the bottle closure (disgorging). Then, the dispatch dosage of Example 1 Was added in the same amount as in Example 1 and uniformly distributed over the 135 bottles. The bottles were then corked.

After stationary storage of the filled bottles for 20 days, the sparkling wine was evaluated as follows:
Aroma: champagne-type aroma, mature =D
Sparkle: high effervescent champagne sparkle =A
Sediments: clear =G

EXAMPLE 3

(Tank fermentation)

The same procedures as in Example 1 were employed, but the first yeast portion ($H_1$) was added to the basic wine with the filling dosage prior to the start of the secondary fermentation and the second yeast portion ($H_2$) was introduced into the tank at time $T_6$, i.e., 16 days after the start of the secondary fermentation. The second yeast portion was also stirred for 30 hours at 48° C., so that the autolysis stability of the second yeast portion was somewhat lower than that in Example 1.

As shown in FIG. 2, the paths of Curves 1, 2 and 6 were substantially the same as that in Example 1. Note, at time $T_6$, there was only an almost imperceptible jump in the pressure distribution of Curve 6 obtained in the case of a pressure tight introduction of the second yeast portion into the pressure tight sealed tank. Curve 3 only started at $T_6$ with the adding of the second yeast portion. Due to the reduced autolysis stability compared with Example 1. Curve 3 dropped off more steeply and at $T_2$ almost reached the same value as in FIG. 1.

The results of the evaluation of the sparkling wine Were the same as in Example 1.

EXAMPLES 4–14

Examples 4–14 were carried out in the same manner as Examples 1 to 3 except using the conditions shown in Tables I–III below. The conditions in Tables I–III below relate to 100 liters of basic wine as in Examples 1 to 3.

TABLE I

| Example | 4 | 5 | 6 | 7 (comparison) |
|---|---|---|---|---|
| Filling dosage | | | | |
| Saccharose (kg) | 2.5 | 2.5 | 2.5 | 2.5 |
| First yeast portion | | | | |
| kg (TS) | 0.02 | 0.02 | 0.02 | 0.02 |
| Type: DSM No. | 70457 | 70457 | 70469 | 70457 |
| Second yeast portion | | | | |
| kg (TS) | 0.02 | 0.02 | 0.02 | 0 |
| Type: DSM No. | 70457 | 70469 | 70451 | — |
| Treatment temperature °C. | 35 | 45 | 55 | — |
| Treatment time hours | 40 | 30 | 10 | — |
| Crude sparkling wine | | | | |
| Percentage of constituents from the first yeast portion dissolved | 20 | 20 | 25 | 20 |
| Percentage of the constituents of the second yeast portion dissolved | 90 | 95 | 95 | — |
| Duration of fermentation | | | | |
| $T_0$ to $T_2$ in days Storage time | 20 | 20 | 20 | 20 |
| $T_2$ to $T_3$ days Second yeast portion addition | 40 | 60 | 20 | 60 |
| before $T_0$ | yes | yes | yes | yes |
| after $T_0$ in days | — | — | — | — |
| Otherwise according to Example | 1 | 1 | 1 | 1 |
| Evaluation | | | | |
| Aroma: | D | D | D | F |
| Sparkle: | A | A | A | C |
| Sediment: | G | G | G | I |

TABLE II

| Example | 8 | 9 | 10 | 11 (comparison) |
|---|---|---|---|---|
| Filling dosage | | | | |
| Saccharose (kg) | 2.5 | 2.5 | 2.5 | 2.5 |
| First yeast portion | | | | |
| kg (TS) | 0.02 | 0.02 | 0.02 | 0.02 |
| Type: DSM No. | 70459 | 70459 | 70469 | 70459 |
| Second yeast portion | | | | |
| kg (TS) | 0.02 | 0.03 | 0.01 | 0 |
| Type: DSM No. | 70459 | 70451 | 70457 | — |
| Treatment temperature °C. | 48 | 48 | 48 | — |
| Treatment time hours | 20 | 20 | 20 | — |
| Crude sparkling wine | | | | |
| Percentage of constituents from the first yeast portion dissolved | 10 | 15 | 10 | 10 |
| Percentage of the constituents of the second yeast portion dissolved | 85 | 90 | 90 | — |
| Duration of fermentation | | | | |
| $T_0$ to $T_2$ in days Storage time | 20 | 20 | 20 | 20 |
| $T_2$ to $T_3$ days Second yeast portion addition | 40 | 30 | 50 | 60 |
| before $T_0$ | yes | yes | yes | yes |
| after $T_0$ in days | — | — | — | — |
| Otherwise according to Example | 2 | 2 | 2 | 2 |
| Evaluation | | | | |
| Aroma: | D | D | E | F |
| Sparkle: | A | A | B | C |
| Sediment: | G | G | G | I |

TABLE III

| Example | 12 | 13 | 14 |
|---|---|---|---|
| Filling dosage | | | |
| Saccharose (kg) | 2.5 | 2.5 | 2.5 |
| First yeast portion | | | |
| kg (TS) | 0.02 | 0.02 | 0.02 |
| Type: DSM No. | 70457 | 70457 | 70469 |
| Second yeast portion | | | |
| kg (TS) | 0.02 | 0.02 | 0.02 |
| Type: DSM No. | 70457 | 70469 | 70451 |
| Treatment temperature °C. | 38 | 48 | 58 |
| Treatment time hours | 50 | 40 | 20 |
| Crude sparkling wine | | | |
| Percentage of constituents from the first yeast portion dissolved | 20 | 20 | 25 |
| Percentage of the constituents of the second yeast portion dissolved | 90 | 95 | 95 |
| Duration of fermentation | | | |
| $T_0$ to $T_2$ in days Storage time | 20 | 20 | 20 |
| $T_2$ to $T_3$ days Second yeast portion addition | 40 | 60 | 20 |
| before $T_0$ | no | no | no |
| after $T_0$ in days | 15 | 19 | 9 |
| Otherwise according to Example | 3 | 3 | 3 |
| Evaluation | | | |
| Aroma: | D | D | D |
| Sparkle: | A | A | A |
| Sediment: | G | G | G |

The abbreviations used in Tables I–III have the meanings given in Table IV below.

TABLE IV

| Abbreviation | Meaning |
|---|---|
| A | highly effervescent champagne sparkle |
| B | effervescent sparkle |
| C | coarse effervescent sparkle |
| D | champagne-type aroma, mature |
| E | smooth, rounded mature |
| F | green, non-smooth, immature |
| G | clear |
| H | just perceptible cloudiness |
| I | definite cloudiness |

The results in Examples 1–14 demonstrate that the present invention is advantageous for shortening the storage time, for increasing the sparkle and aroma-causing autolyzate content and for avoiding cloudiness, both in a tank fermentation process and in a bottle fermentation process.

While this invention has been described in detail with reference to specific embodiments thereof, it will be apparent to one skilled in the art that various changes and modifications can be made therein without departing from the spirit and scope of the invention.

We claim:

1. A process for producing sparkling wine comprising the steps of:
   (1) adding a first yeast portion and saccharose to sterilized wine,
   (2) carrying out secondary fermentation, under a pressure-tight seal, wherein dissolved constituents from the first yeast portion are contained in the resulting crude sparkling wine,
   (3) separating insoluble fractions from the resulting crude sparkling wine, and
   (4) adding a composition comprising saccharose to the resulting crude sparkling wine so as to obtain the sparkling wine,
   wherein, prior to the end of the secondary fermentation, a second yeast portion is added to the resulting wine mixture of step (1), wherein the autolysis stability of the second yeast portion is reduced by damaging the cell walls thereof prior to the addition of the second yeast portion to the resulting wine mixture of step (1), and wherein the insoluble fractions of the first yeast portion which remain following autolyzation of the first yeast portion are at least 70%, based on the total amount thereof, and the resulting loss in autolyzate is adjusted by the second yeast portion.

2. The process according to claim 1 wherein the insoluble fractions which remain following autolyzation by the first yeast portion are at least 80%, based on the total amount thereof, and the resulting loss in autolyzate is adjusted by the second yeast portion.

3. The process according to claim 1, wherein the second yeast portion is added before beginning the secondary fermentation and bottle fermentation is carried out.

4. The process according to claim 1, wherein the second yeast portion is added during the secondary fermentation and tank fermentation is carried out.

5. The process according to claim 1, wherein the autolysis stability of the second yeast portion is adjusted such that the percentage of cells of the second yeast portion whose cell walls are broken open by autolyzation, when 60% of the saccharose has been consumed by the secondary fermentation, is 80 to 90% of the total amount of the second yeast portion.

6. The process according to claim 5, wherein the autolysis stability of the second yeast portion is adjusted such that the percentage of cells of the second yeast portion whose cell walls are broken open by autolyzation, when 60% of the saccharose has been consumed by the secondary fermentation, is 82% of the total amount of the second yeast portion.

7. The process according to claim 1, wherein the autolysis stability is reduced by heating to 40 to 55° C. for 10 to 40 hours, accompanied by simultaneous stirring.

8. The process according to claim 7, wherein the autolysis stability is reduced by heating to 48° C. for 20 hours, accompanied by simultaneous stirring.

9. The process according to claim 1, wherein 0.01 to 0.06 kg of a dried first yeast portion per 100 liters and 0.5 to 2 times as much of a dried second yeast portion is used, and in each case, such is used prior to the beginning of the secondary fermentation.

10. The process according to claim 9, wherein 0.02 kg of a dried first yeast portion per 100 liters and 1.0 times as much of a dried second yeast portion is used, and in each case, such is used prior to the beginning of the secondary fermentation.

11. The process according to claim 1, wherein the storage time is terminated and the insoluble fractions are separated as soon as the constituents dissolved from the first yeast portion and second yeast portion combined represent 95 to 120% of the soluble constituents of the first yeast portion.

12. The process according to claim 11, wherein the storage time is terminated and the insoluble fractions are separated as soon as the constituents dissolved from the first yeast portion and second yeast portion combined represent 110% of the soluble constituents of the first yeast portion.

13. The process according to claim 11, wherein the storage time is terminated and the insoluble constituents are separated 20 to 60 days after all of the saccharose has been consumed.

14. The process according to claim 13, wherein the storage time is terminated and the insoluble constituents are separated 40 days after all of the saccharose has been consumed.

15. The process according to claim 1, wherein the same yeast strain is used for both the first yeast portion and the second yeast portion.

16. The process according to claim 1, wherein the yeast strain of the first portion and the yeast strain of the second yeast portion is selected from the group consisting of:
   (1) *Saccharomyces cerevisiae*, champagne strain. DSM No. 70457
   (2) *Saccharomyces cerevisiae*, cold fermenting yeast strain. DSM No. 70469
   (3) *Saccharomyces cerevisiae*, Rudesheimer strain. DSM No. 70451, and
   (4) *Saccharomyces cerevisiae*, champagne-Ay strain. DSM No. 70459,
   wherein the yeast of the first yeast portion is a different strain from the yeast of the second yeast portion.

* * * * *